(12) United States Patent
Lee

(10) Patent No.: US 6,290,298 B1
(45) Date of Patent: Sep. 18, 2001

(54) TILTABLE HEADREST FOR VEHICLE SEAT

(75) Inventor: Sung Jong Lee, Seoul (KR)

(73) Assignee: Han Shin Industry Co., LTD, Choongchungbuk-Do (KR)

( * ) Notice: Subject to any disclaimer, the term of this patent is extended or adjusted under 35 U.S.C. 154(b) by 0 days.

(21) Appl. No.: 09/271,399

(22) Filed: Mar. 17, 1999

(30) Foreign Application Priority Data

Jun. 10, 1998 (KR) .................................................. 98/21386

(51) Int. Cl.[7] ...................................................... A47C 7/36
(52) U.S. Cl. .......................................... 297/408; 297/391
(58) Field of Search .................................... 297/391, 404, 297/408, 403, 216.12

(56) References Cited

U.S. PATENT DOCUMENTS

| | | | | |
|---|---|---|---|---|
| 3,761,125 | * | 9/1973 | Glance | 297/216.12 |
| 5,222,784 | * | 6/1993 | Hamelin | 297/408 |
| 5,836,648 | * | 11/1998 | Karschin et al. | 297/408 X |
| 6,007,154 | * | 12/1999 | Parker et al. | 297/410 X |

FOREIGN PATENT DOCUMENTS

| | | | | |
|---|---|---|---|---|
| 1294620 | * | 5/1969 | (DE) | 297/408 |
| 1938253 | * | 2/1971 | (DE) | 297/408 |
| 2519189 | * | 11/1975 | (DE) | 297/411.38 |
| 2647725 | * | 4/1978 | (DE) | 297/408 |
| 2372610 | * | 8/1978 | (FR) | 297/408 |
| 937220 | | 10/1993 | (KR) | . |

* cited by examiner

Primary Examiner—Milton Nelson, Jr.
(74) Attorney, Agent, or Firm—Ladas and Parry

(57) ABSTRACT

The present invention provides a tiltable headrest for a vehicle seat. The tiltable headrest comprises a hinge part for causing a headrest body to be supported by a support bar and for allowing the support bar to be rotated within a predetermined angle relative to a body support frame which supports the headrest body; and an auxiliary guide arrangement for surrounding the hinge part such that it can guide rotation of the support bar within the predetermined angle relative to the body support frame. The hinge part has a first pair of annular leaf springs intervened between the body support frame and a head portion of a rivet serving as a hinge shaft which couples the body support frame to a flat end portion of the support bar, the first pair of annular leaf springs being brought into back-to-back contact with each other; a first flat washer intervened between the body support frame and one of the first pair of annular leaf springs; and second and third flat washers disposed on both side surfaces of the flat end portion of the support bar, respectively.

7 Claims, 6 Drawing Sheets

TILTABLE HEADREST FOR VEHICLE SEAT

BACKGROUND OF THE INVENTION

1. Field of the Invention

The present invention relates to a tiltable headrest for a vehicle seat, and more particularly, the present invention relates to a tiltable headrest for a vehicle seat which has a hinge part for allowing a support bar to be rotated within a predetermined angle relative to a body support frame supporting a headrest body, the hinge part having a pair of annular leaf springs intervened between the body support frame and a head portion of a rivet serving as a hinge shaft such that they are brought into back-to-back contact with each other and a pair of flat washers fitted around the hinge shaft at both sides of a flat end portion of the support bar, respectively.

2. Description of the Related Art

Generally, a headrest provided at an upper end of a seat back in a vehicle or an aircraft is used in a state that both ends of a support bar 20, which are embedded into a headrest body 10, are fitted into a pair of guide holes formed in the seat back, respectively, as shown in FIG. 1. However, in this headrest structure, because the headrest body 10 is securely fixed to the support bar 20, it is impossible for a driver or passenger to adjust the angle of a headrest.

To solve this problem, a technique for allowing a headrest to be tilted is disclosed in Korean Utility Model Publication Gazette No. 93-7220. According to the technique, in a headrest provided at an upper end of a seat back, a lower end of a support member is embedded into the seat back, and an angle adjustor having a sector-shaped configuration is integrally molded to an upper end of the support member. A center hole is formed at a center portion of the sector-shaped angle adjustor, and a guide groove is formed adjacent to an edge portion of the sector-shaped angle adjustor such that it circumferentially extends. A plurality of headrest support fixing holes are formed in the guide groove such that they are circumferentially spaced apart one from another. A space into which the sector-shaped angle adjustor is received is defined in a lower end of a headrest body. One end of a headrest support around which a coil spring is wound, is secured into a wall portion of the headrest body, which defines the space for receiving the sector-shaped angle adjustor. A long shaft portion of the headrest support is passed through the center hole, and a short shaft portion of the headrest support is passed through one of the plurality of headrest support fixing holes.

However, the tiltable headrest constructed as mentioned above encounters a problem in that the sector-shaped angle adjustor must be integrally molded to the upper end of the support. Further, since the headrest support is assembled to the angle adjustor such that the short shaft portion thereof is passed through one of the plurality of headrest support fixing holes, the assembling operation cannot be performed in an easy manner. In addition, because the space for receiving the angle adjustor must be defined in the headrest body, the headrest body must be separately formed having this space.

In view of these problems, a tiltable headrest as shown in FIG. 2 is disclosed in the art. In the tiltable headrest as shown in FIG. 2, a hinge part 30 is provided at a lower end of a body support frame 11 which supports a headrest body 10 as shown in FIG. 1. An upper end of a support bar 20 is rotatably coupled to the hinge part 30 by a hinge shaft 33. The hinge part 30 has a first limiter 31 which can be brought into contact with a lower portion of the support bar 20 and a second limiter 32 which can be brought into contact with an upper portion of the support bar 20. An auxiliary guide arrangement 40 which surrounds the hinge part 30, includes first and second guide members 43 and 44 which cooperate with each other to define a hinge part receiving space 42 therebetween. The first guide member 43 is formed with a projection 45, and the second guide member 44 is formed with a groove 46 into which the projection 45 is engaged. Between lower ends of the first and second guide members 43 and 44, there is defined a support bar guide groove 41 which allows the support bar 20 to be rotated therein within a predetermined angle.

Referring to FIG. 3, there is shown a schematic perspective view illustrating the tiltable headrest of FIG. 2, which is in an assembled state. In FIG. 3, the hinge part 30 shown in FIG. 2 is received into the hinge part receiving space 42 which is defined by the first and second guide members 43 and 44 of the auxiliary guide arrangement 40 in a state that the support bar 20 and the body support frame 11 are rotatably coupled to the hinge part 30, and the projection 45 is engaged into the groove 46. At this time, because the support bar 20 is fixedly secured to the seat back, the body support frame 11 is actually rotated, whereby the angle of a headrest body 10 can be adjusted.

Referring to FIG. 4, there is shown a side view illustrating an independent appearance of the hinge part of FIG. 2. As described above, the body support frame 11 and the support bar 20 are rotatably coupled to each other by the hinge shaft 33 of the hinge part 30. The hinge part 30 has the first and second limiters 31 and 32, and the support bar 20 is rotatably coupled to the hinge part 30 via the hinge shaft 33. At this time, since the upper end of the support bar 20 is rotatably coupled to the hinge part 30 by the hinge shaft 33 while a wear-resistant packing 34 is intervened therebetween, once the support bar 20 is rotated relative to the body support frame 11 to adjust the angle of the headrest body 10, the adjusted angle of the headrest body 10 is maintained as it is, and accordingly, there is no need for separate angle adjusting means. At this time, even though the body support frame 11 is actually rotated about the hinge part 30 due to the fact that the support bar 20 is fixedly secured to the seat back, it was stated, in view of convenience of illustration and explanation, that the support bar 20 is rotated about the hinge part 30.

FIG. 5 is a side view illustrating the hinge part 30 of FIG. 4, which is surrounded by the auxiliary guide arrangement 40. As described above, the body support frame 11 and the support bar 20 are rotatably coupled to each other by the hinge shaft 33 at the hinge part 30. The hinge part 30 has the first and second limiters 31 and 32 which function to delimit a rotating angle of the support bar 20. For doing this, it is preferred that the upper end of the support bar 20 is formed as a flat end portion 23 and first and second stepped portions 21 and 22 are formed on lower ends of both flat side surfaces of the flat end portion 23, respectively, which correspond to the first and second limiters 31 and 32. Of course, the packing 34 is provided at the upper end of the support bar 20, which is formed as the flat end portion 23, such that the support bar 20 is coupled to the hinge part 30 by the hinge shaft 33 while being biased by the packing 34. At this time, although the support bar 20 is illustrated in FIG. 5 as being rotated, it is to be readily understood that since the support bar 20 is fixedly secured to the seat back, the body support frame 11 is actually rotated about the hinge part 30 to adjust the angle of the headrest body 10. Accordingly, due to the fact that the hinge part 30 is received into the hinge part receiving space 42 and the support bar guide groove 41 is defined at a lower portion of the auxiliary guide arrangement 40, which corresponds to the support bar 20, for example, if the body support frame 11 is rotated in a clockwise direction while the support bar 20 is held in a position depicted by the one-dot chain line in FIG. 5, a positional relationship between the support bar 20 and the body support frame 11 can be depicted as represented by the solid line in FIG. 5. When explaining the support bar 20 as being rotated, in view of illustration convenience, since the support bar 20 is rotatably coupled to the hinge part 30 by the hinge shaft 33 while the packing 34 is intervened between the support bar 20 and the hinge part 30 to bias them toward each other, the angle of the headrest body 10 can be adjusted with no provision of separate angle adjusting means. In other words, by applying force to the headrest body 10 while overcoming the biasing force of the packing 34, it is possible to adjust an angle of the headrest body 10. Moreover, when the support bar 20 reaches a limit of the predetermined angle after being rotated along the support bar guide groove 41, it is prevented from being overly rotated, by the fact that the first limiter 31 or the second limiter 32 is engaged with the first stepped portion 21 or the second stepped portion 22, respectively. In addition, since the support bar 20 can be freely rotated along the support bar guide groove 41 while its contact with cushioning material of the headrest body 10 is prevented by the auxiliary guide arrangement 40, the headrest body 10 is protected from being damaged even when the angle adjustment operation is repeatedly performed.

Referring to FIG. 6, there is shown a cross-sectional view of the hinge part 30 of FIG. 4. As described above, the body support frame 11 and the flat end portion 23 of the support bar 20 are rotatably coupled to each other by the hinge shaft 33. An annular leaf spring serving as the packing 34 is intervened between the body support frame 11 and a head portion 33-1 of a rivet serving as the hinge shaft 33, and a nylon washer 35 serving as another packing is intervened between the body support frame 11 and the flat end portion 23 of the support bar 20. By this, as the annular leaf spring 34 is depressed by the head portion 33-1 of the rivet 33, it biases the body support frame 11 toward the flat end portion 23 of the support bar 20. Accordingly, frictional force which can be generated at the nylon washer 35 intervened between the body support frame 11 and the flat end portion 23 of the support bar 20, is increased, thereby to maintain an inclination angle of the body support frame 11 as it is.

However, the tiltable headrest of the related art, constructed as mentioned above, suffers from defects in that if the angle adjusting operation for the body support frame 11 is performed up to several hundred times, for example, about 400–500 repeat count, as the nylon washer 35 is worn out, the frictional force is decreased, and as the annular leaf spring 34 and the body support frame 11 are worn out at their contact region, the frictional force is further decreased, whereby it is difficult to maintain an angle of the headrest body 10, which is established by the angle adjusting operation, as it is.

SUMMARY OF THE INVENTION

Accordingly, the present invention has been made in an effort to solve the problems occurring in the related art, and an object of the present invention is to provide a tiltable headrest for a vehicle seat, which is structured to increase a repeat count of hinge operations by the fact that a plurality of leaf springs and a plurality of flat washers are disposed at a hinge part thereof.

In order to achieve the above object, a hinge part of a tiltable headrest of the present invention includes a pair of annular leaf springs intervened between a body support frame which supports a headrest body and a head portion of a rivet serving as a hinge shaft which couples the body support frame to a flat end portion of a support bar, such that they are brought into back-to-back contact with each other, and a pair of flat washers fitted around the hinge shaft at both sides of the flat end portion of the support bar, respectively.

That is, according to one aspect of the present invention, there is provided a tiltable headrest for a vehicle seat, comprising: a hinge part for causing a headrest body to be supported by a support bar and for allowing the support bar to be rotated within a predetermined angle relative to a body support frame which supports the headrest body; and an auxiliary guide arrangement for surrounding the hinge part such that it can guide rotation of the support bar within the predetermined angle relative to the body support frame; the hinge part having a first pair of annular leaf springs intervened between the body support frame and a head portion of a rivet serving as a hinge shaft which couples the body support frame to a flat end portion of the support bar, the first pair of annular leaf springs being brought into back-to-back contact with each other, a first flat washer intervened between the body support frame and one of the first pair of annular leaf springs, and second and third flat washers disposed on both side surfaces of the flat end portion of the support bar, respectively.

According to another aspect of the present invention, the tiltable headrest further comprises a second pair of annular leaf springs intervened between the flat end portion of the support bar and an end portion of the rivet such that they are opposed to the first pair of annular leaf springs, the second pair of annular leaf springs being brought into back-to-back contact with each other.

According to still another aspect of the present invention, the tiltable headrest further comprises a fourth flat washer intervened between the end portion of the rivet and one of the second pair of annular leaf springs for biasing the second pair of annular leaf springs toward the flat end portion of the support bar.

By the features of the present invention, since a scheme in which a hinge part of a tiltable headrest employs a pair of annular leaf springs, is adopted, the spring force of the annular leaf springs is maximized thereby to be effectively used upon hinge operations for improving functionality of the hinge part.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
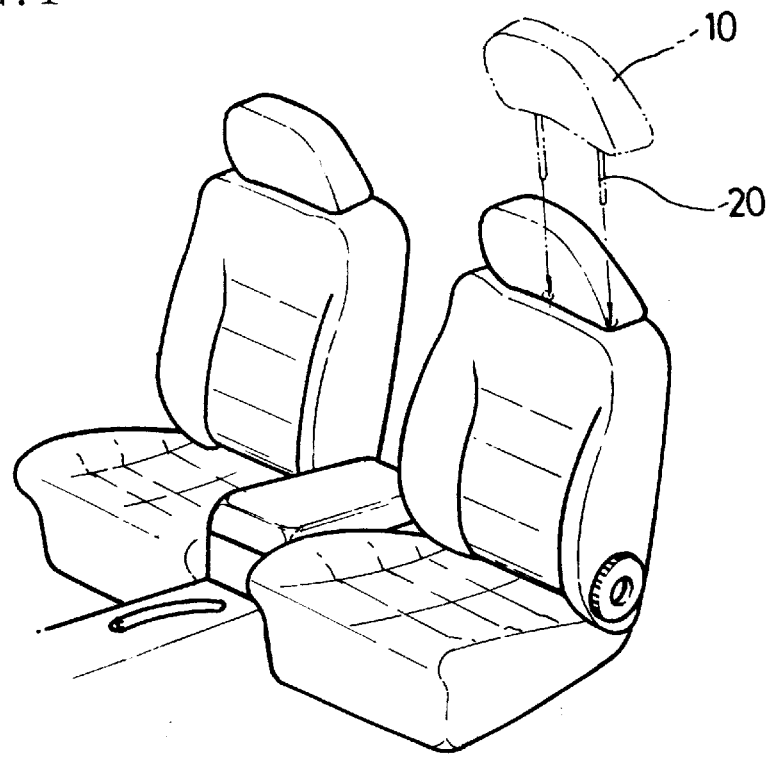
FIG. 1 is a perspective view of a conventional headrest for a vehicle seat.
Figure 2:
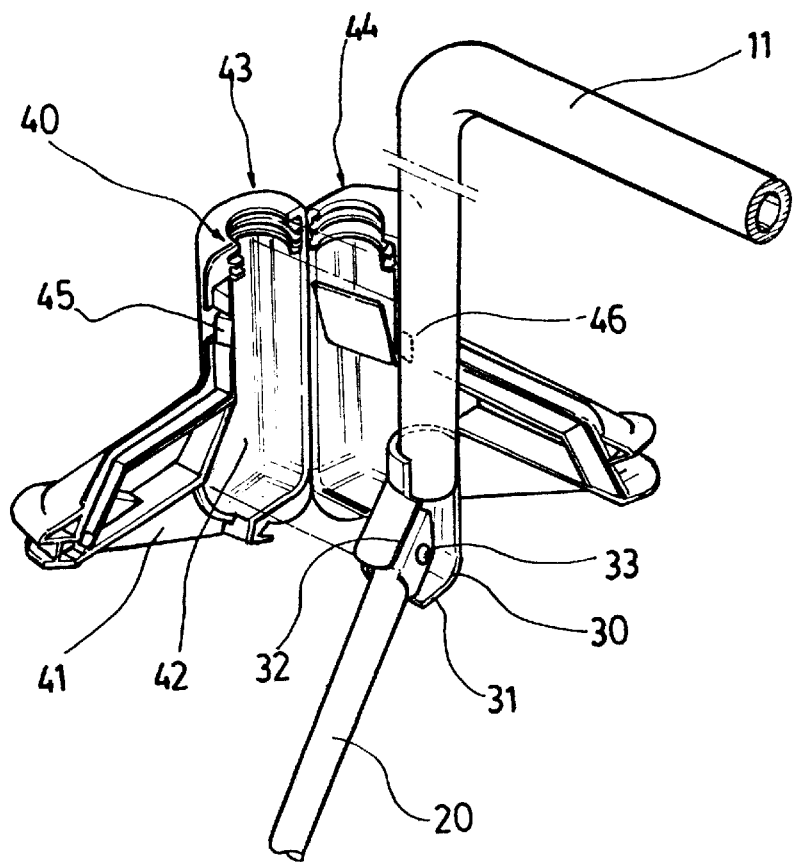
FIG. 2 is a perspective view illustrating a hinge part and an auxiliary guide arrangement used in a tiltable headrest for a vehicle seat, of the related art.
Figure 3:
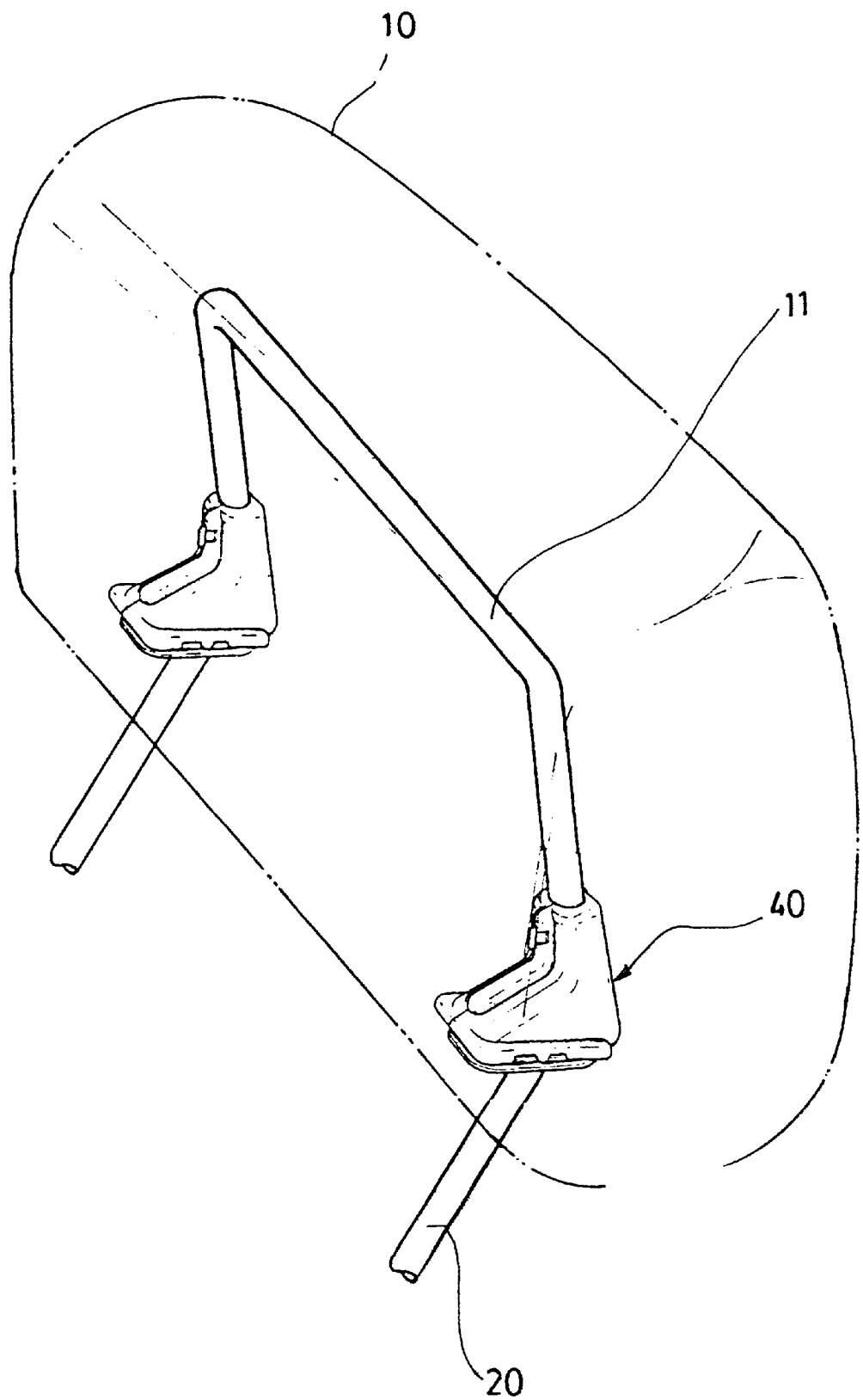
FIG. 3 is a schematic perspective view illustrating the tiltable headrest of FIG. 2, which is in an assembled state.
Figure 4:
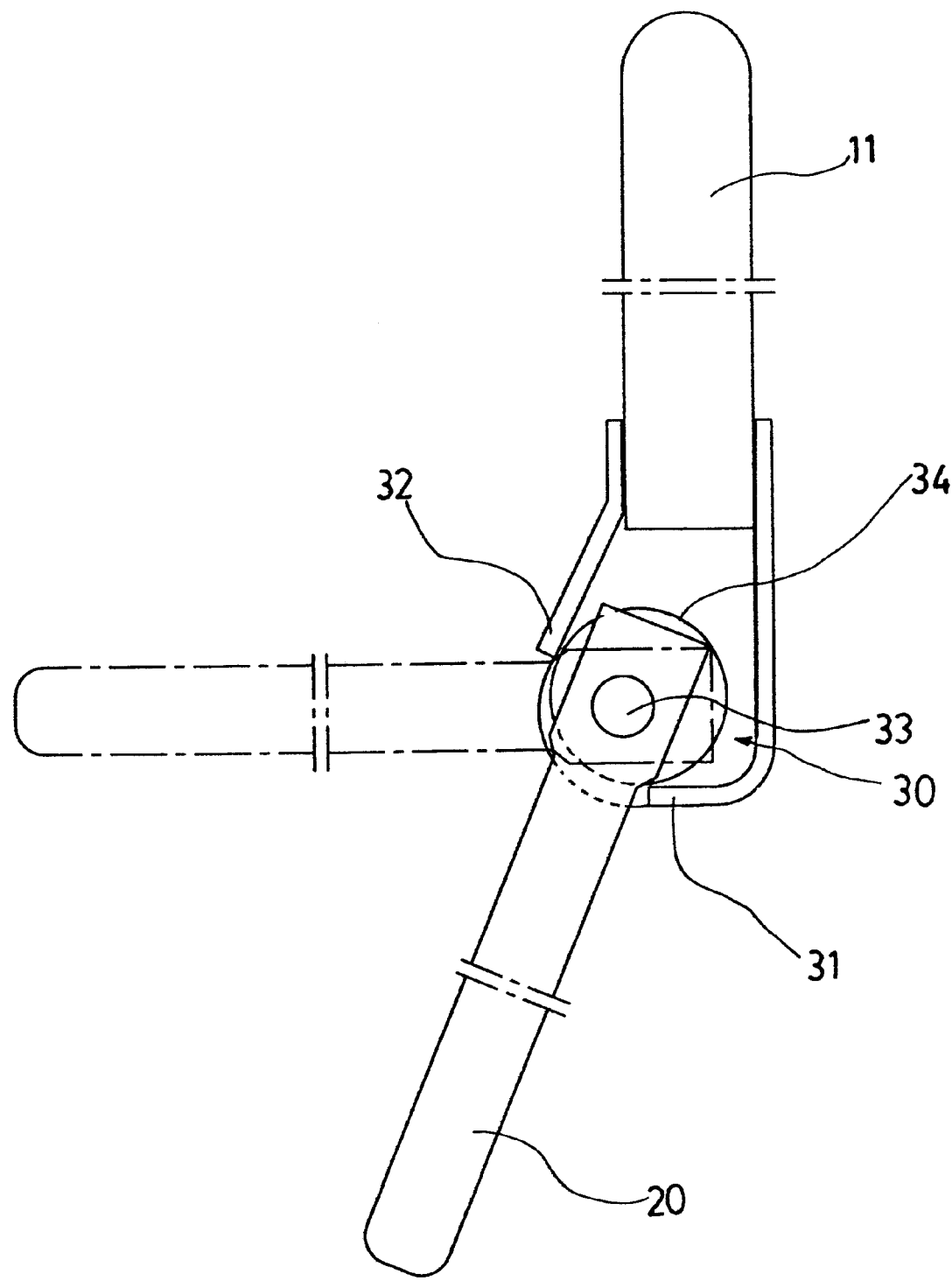
FIG. 4 is a side view illustrating an independent appearance of the hinge part of FIG. 2.
Figure 5:
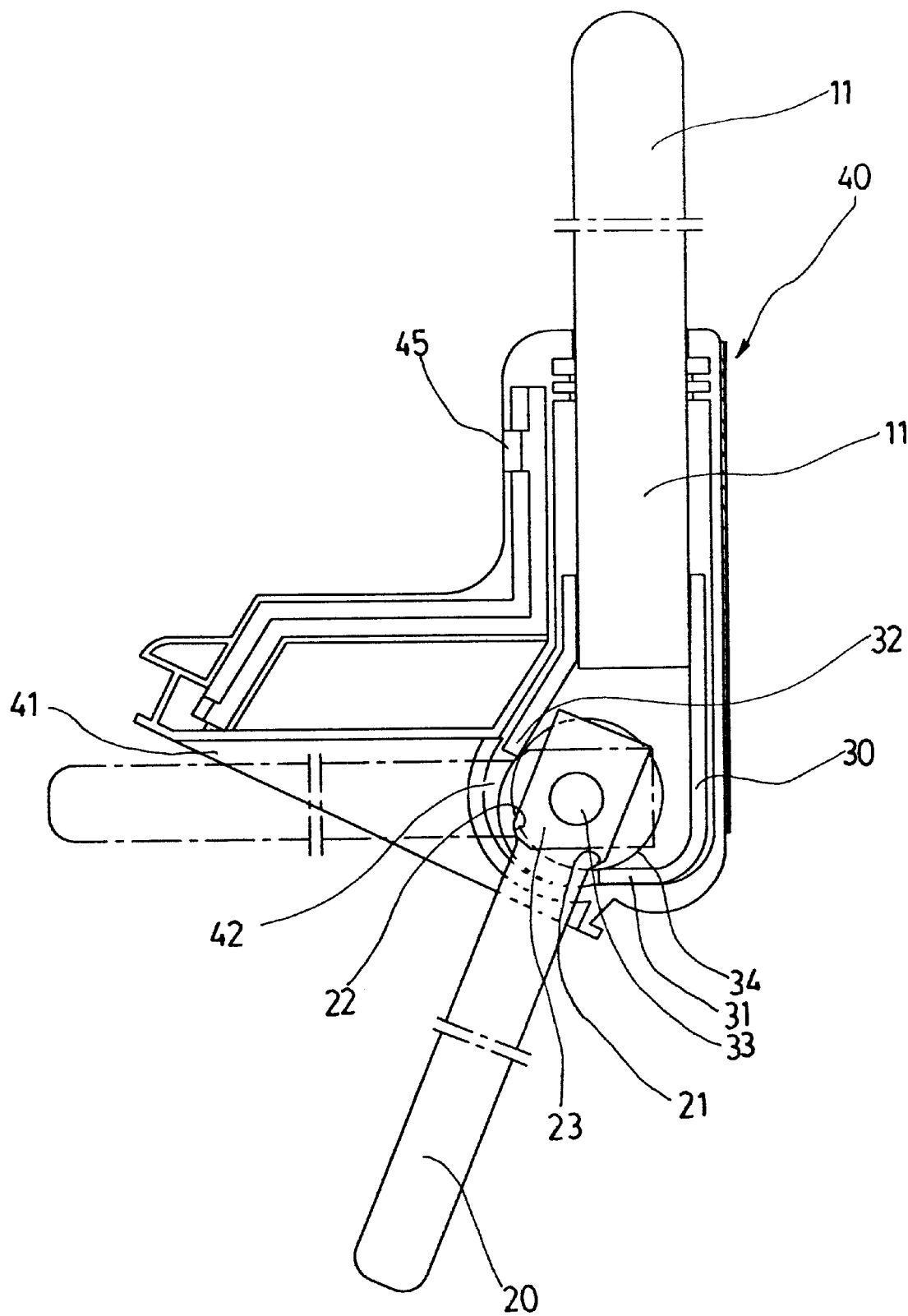
FIG. 5 is a side view illustrating the hinge part of FIG. 2, which is received in the auxiliary guide arrangement.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 7:
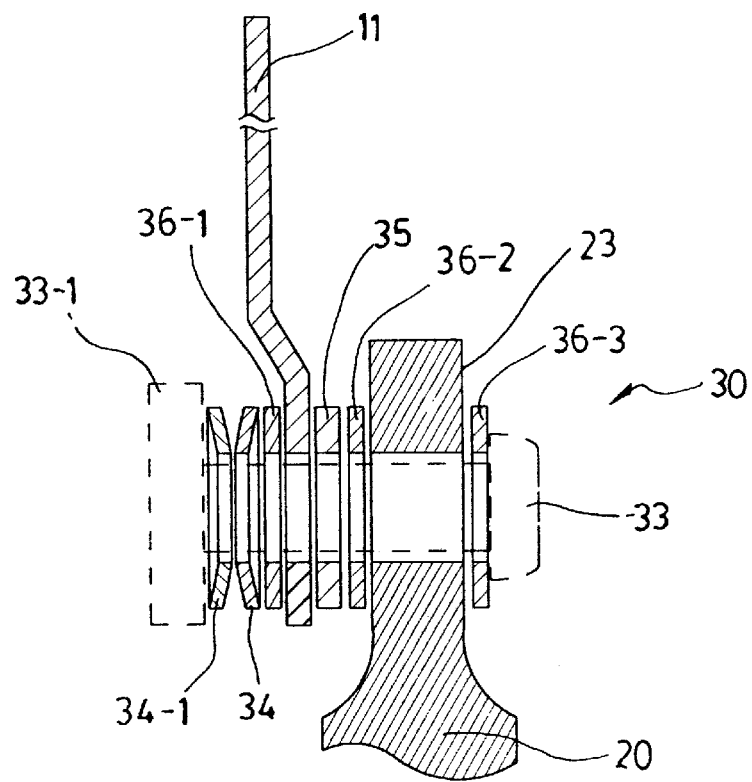
FIG. 7 is a cross-sectional view illustrating a hinge part of a tiltable headrest for a vehicle seat, in accordance with embodiment of the present invention.

Referring to FIG. 7, there is shown a cross-sectional view illustrating a hinge part of a tiltable headrest for a vehicle seat, in accordance with an embodiment of the present invention. A hinge part 30 of the present invention includes a first pair of annular leaf springs 34 and 34-1 which are intervened between a body support frame 11 and a head portion 33-1 of a rivet serving as a hinge shaft 33 which couples the body support frame 11 to a flat end portion 23 of a support bar 20. The first pair of annular leaf springs 34 and 34-1 are brought into back-to-back contact with each other. The hinge part 30 further includes a first flat washer 36-1 which is intervened between the body support frame 11 and the annular leaf spring 34 and second and third flat washers 36-2 and 36-3 which are fitted around a shank portion of the hinge shaft 33 on both side surfaces of the flat end portion 23 of the support bar 20, respectively. A nylon washer 35 is fitted around the shank portion of the hinge shaft 33 between the body support frame 11 and the second flat washer 36-2.

Figure 6:
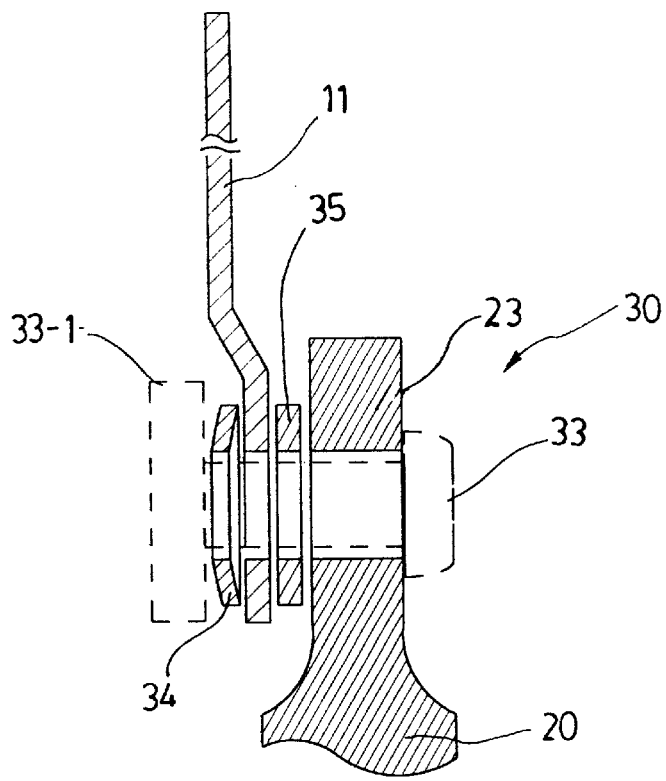
FIG. 6 is a cross-sectional view of the hinge part of FIG. 4.

At this time, due to the fact that the first pair of annular leaf springs 34 and 34-1 are fitted around the shank portion of the hinge shaft 33 between the head portion 33-1 of the hinge shaft 33 and the body support frame 11 such that they are brought into back-to-back contact with each other, when riveting the body support frame 11 and the support bar 20 together (although the hinge shaft 33 is illustrated as having substantially a long length and the annular leaf springs 34 and 34-1 and washers 35, 36-1, 36-2 and 36-3 are illustrated as being spaced apart by a distance one from another, it is to be readily understood that the hinge shaft 33 actually has a length shorter than illustrated and the leaf springs 34 and 34-1 and washers 35, 36-1, 36-2 and 36-3 are in close contact one with another), elastic force of the first pair of annular leaf springs 34 and 34-1 is increased. Further, since the first flat washer 36-1 is fitted around the shank portion of the hinge shaft 33 between the body support frame 11 and the annular leaf spring 34, the body support frame 11 is prevented from being worn out due to direct contact with the annular leaf spring 34, whereby a repeat count of hinge operations of the tiltable headrest is increased. Moreover, due to the fact that the second flat washer 36-2 is intervened between the nylon washer 35 and the flat end portion 23 of the support bar 20, the nylon washer 35 is prevented from being worn out, whereby the repeat count of hinge operations of the tiltable headrest is further increased. In this connection, it was found from experiments that the tiltable headrest reveals a tendency to be slightly varied in its angle after the hinged operations were performed through a repeat count of about 3,000–4,000 times, and accordingly, the tiltable headrest of the present embodiment has fivefold durability as compared to that shown in FIG. 6.

Figure 8:
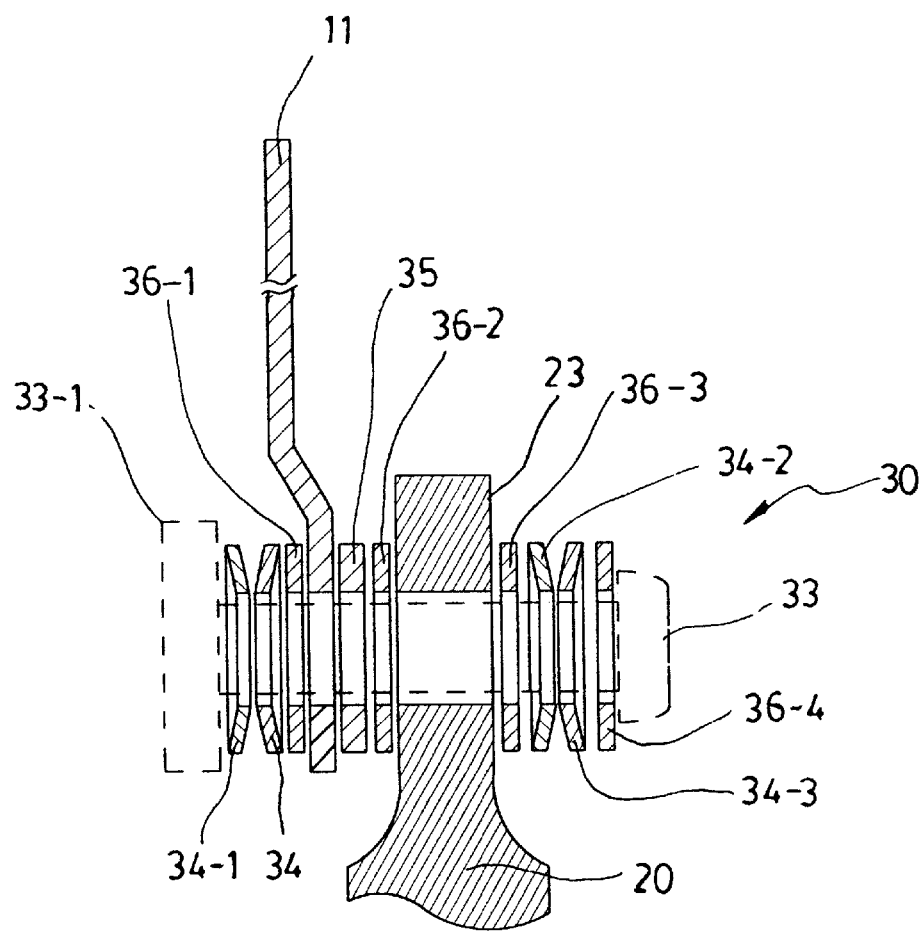
FIG. 8 is a cross-sectional view illustrating a hinge part of a tiltable headrest for a vehicle seat, in accordance with another embodiment of the present invention.

Referring to FIG. 8, there is shown a cross-sectional view illustrating a hinge part of a tiltable headrest for a vehicle seat, in accordance with another embodiment of the present invention. A hinge part 30 of the present invention includes a first pair of annular leaf springs 34 and 34-1 which are intervened between a body support frame 11 and a head portion 33-1 of a rivet serving as a hinge shaft 33 which couples the body support frame 11 to a flat end portion 23 of a support bar 20. The first pair of annular leaf springs 34 and 34-1 are brought into back-to-back contact with each other. The hinge part 30 further includes a first flat washer 36-1 which is intervened between the body support frame 11 and the annular leaf spring 34 and second and third flat washers 36-2 and 36-3 which are fitted around a shank portion of the hinge shaft 33 on both side surfaces of the flat end portion 23 of the support bar 20, respectively. A nylon washer 35 is fitted around the shank portion of the hinge shaft 33 between the body support frame 11 and the second flat washer 36-2. The hinge part 30 of the present embodiment further includes a second pair of annular leaf springs 34-2 and 34-3 which are intervened between the flat end portion 23 of the support bar 20 and an end portion of the hinge shaft 33 such that they are opposed to the first pair of annular leaf springs 34 and 34-1 and brought into back-to-back contact with each other. A fourth flat washer 36-4 is intervened between the end portion of the hinge shaft 33 and the annular leaf spring 34-3 for biasing the second pair of annular leaf springs 34-2 and 34-3 toward the flat end portion 23 of the support bar 20.

In the tiltable headrest of FIG. 8, constructed as mentioned above, due to the fact that the first pair of annular leaf springs 34 and 34-1 are fitted around the shank portion of the hinge shaft 33 between the head portion 33-1 of the hinge shaft 33 and the body support frame 11 (such that they are brought into back-to-back contact with each other) and the second pair of annular leaf springs 34-2 and 34-3 are fitted around the shank portion of the hinge shaft 33 between the end portion of the hinge shaft 33 and the body support frame 11 (such that they are brought into back-to-back contact with each other), elastic force of the first and second pairs of annular leaf springs 34 and 34-1; 34-2 and 34-3 is increased, whereby a repeat count of hinge operations of the tiltable headrest is increased owing to improvement in endurability of the hinge structure between the body support frame 11 and the support bar 20. It was found from experiments that the tiltable headrest of the present embodiment retains its hinge function through a repeat count of about 4,000–5,000 times while not experiencing diminishment in frictional force.

As described above, according to the present invention, advantages are provided in that since the angle of a headrest body is adjusted using a separate auxiliary connecting arrangement, the headrest body is prevented from being damaged when the angle of the headrest body is adjusted. Also, since a packing disposed between a support bar and a hinge part is used as means which renders the angle adjustment operation of the headrest body, the angle of the headrest can be conveniently adjusted without using separate angle adjustment means. In addition, due to the fact that the hinge part rendering the angle adjustment operation is provided with first and second limiters and the support bar is formed with first and second stepped portions, when the support bar is rotated by a predetermined angle in a clockwise or counterclockwise direction, the first and second stepped portions can be engaged to the first and second limiters, respectively, to prevent the support bar from being overly rotated.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A tiltable headrest for a vehicle seat, comprising:

a body support frame supporting a headrest body, a support bar, a hinge part for causing the headrest body to be supported by the support bar and for allowing the body support frame to be rotated within a predetermined angle relative to the support bar; and an auxiliary guide arrangement for surrounding the hinge part such that the auxiliary guide arrangement can guide the rotation of the body support frame within the predetermined angle relative to the support bar;

the hinge part having a hinge shaft on which said body support frame and said support bar are supported in spaced relation along said shaft, a first pair of annular leaf springs intervened between the body support frame and a head portion of the hinge shaft which couples the body support frame to a flat end portion of the support bar, the first pair of annular leaf springs being brought into back-to-back contact with each other, a first flat washer intervened between the body support frame and one of the first pair of annular leaf springs, and second and third flat washers disposed on both side surfaces of the flat end portion of the support bar, respectively, said second flat washer being disposed between the body support frame and the support bar.

2. The tiltable headrest as claimed in claim 1, further comprising:

a second pair of annular leaf springs intervened between the flat end portion of the support bar and an end portion of a rivet such that they are opposed to the first pair of annular leaf springs, the second pair of annular leaf springs being brought into back-to-back contact with each other.

3. The tiltable headrest as claimed in claim 2, further comprising:

a fourth flat washer intervened between the end portion of the rivet and one of the second pair of annular leaf springs for biasing the second pair of annular leaf springs toward the flat end portion of the support bar.

4. A tiltable headrest as claimed in claim 1, further comprising a fourth washer between said second washer and said body support frame.

5. A tiltable headrest as claimed in claim 4 wherein said support bar includes an attachment portion adapted for insertion into guide holes in the vehicle seat, said flat end portion being in axial alignment with said attachment portion.

6. A tiltable headrest as claimed in claim 1 wherein said hinge shaft is stationary and said body support frame is rotatable on said shaft, said first pair of annular leaf springs being in engagement with said head portion of said hinge shaft and said one of the first pair of leaf springs being in engagement with said second washer.

7. The tiltable headrest as claimed in claim 1 wherein said hinge shaft comprises a rivet which provides axial force to bring said pair of annular leaf springs into back-to-back contact.

* * * * *